United States Patent [19]

Dembiak et al.

[11] 4,112,247
[45] Sep. 5, 1978

[54] GAS FEEDER PIPE ASSEMBLY INCLUDING ELECTRICAL CONDUCTORS

[75] Inventors: Matthew R. Dembiak, Clifton, N.J.; John F. Finnegan, Claymont; Thomas B. Reece, Wilmington, both of Del.; Howard W. Rudolph, Jr., Birdsboro, Pa.

[73] Assignees: Western Electric Company, Inc.; American Telephone & Telegraph Co., Inc., both of New York, N.Y.

[21] Appl. No.: 724,669

[22] Filed: Sep. 20, 1976

[51] Int. Cl.² .............................................. H01B 7/18
[52] U.S. Cl. ............................... 174/16 R; 174/70 R; 174/102 D; 174/130
[58] Field of Search ................. 174/23 R, 23 C, 15 C, 174/16 R, 102 D, 105 R, 130, 108, 70 R, 70 C, 72 R

[56] References Cited

U.S. PATENT DOCUMENTS

| | | | |
|---|---|---|---|
| 1,539,490 | 5/1925 | Hunter | 174/15 C |
| 3,477,474 | 11/1969 | Mesler | 174/102 R X |
| 3,613,231 | 10/1971 | Pugh | 174/15 C X |
| 3,988,526 | 10/1976 | Rasquin et al. | 174/130 X |
| 3,989,884 | 11/1976 | Friedrich et al. | 174/15 C |

FOREIGN PATENT DOCUMENTS

| | | | |
|---|---|---|---|
| 622,506 | 6/1961 | Canada | 174/15 C |
| 2,150,113 | 4/1972 | Fed. Rep. of Germany | 174/15 C |
| 1,940,148 | 2/1971 | Fed. Rep. of Germany | 174/15 C |
| 889,768 | 9/1953 | Fed. Rep. of Germany | 174/15 C |

*Primary Examiner*—Arthur T. Grimley
*Attorney, Agent, or Firm*—W. O. Schellin

[57] ABSTRACT

A gas feeder pipe assembly includes a central duct capable of functioning as a gas feeder pipe and a plurality of pairs of electrical conductors in a unitary structure. The gas feeder pipe is located at the center of the structure, and the conductors surround the pipe in an oscillating lay. The pipe and the conductors are wrapped in a polyester film and enclosed in a coated aluminum sheath. A polyethylene jacket bonded to the aluminum sheath provides the outermost protection for the assembly.

4 Claims, 2 Drawing Figures

GAS FEEDER PIPE ASSEMBLY INCLUDING ELECTRICAL CONDUCTORS

BACKGROUND OF THE INVENTION

1. Field of the Invention

The present invention relates to electrical cables and particularly to a gas feeder pipe assembly including electrical conductors. Such a pipe supplies a dry gas under pressure to a telecommunications cable to prevent moisture from penetrating the cable.

2. Discussion of the Prior Art

In the past, cables such as underground cables have been pressurized with a source of dry gas to prevent environmental moisture from permeating through the protective shields of such cables to adversely affect the electrical characteristics of electrical conductors within the cables. The dry gas is fed to the cables at various points along their paths to provide desired gas pressures throughout the lengths of the cables.

It has been realized that the use of dry gas can serve another important function to aid in providing quality communications lines. Aside from preventing the moisture from penetrating into the cables, gas pressure is used to monitor whether breaks in the shields of the cables exist. The gas pressure is measured at various stations along the lengths of the cables, and particularly at such stations where the gas is introduced into the cables. Pressure drops at the monitoring stations are indicative of defects in cable sheaths. Such defects can result in possible future troubles with communication lines within the cables in spite of the introduction of the dry gas. Preventive repairs can consequently be made on such cables during which time alternate communication routes are established without interruption of service.

Monitoring transducers transmit electrical signals indicative of gas pressures at the monitoring stations to central service stations. In accordance with prior art practice, conductor pairs in the communication cables are dedicated to transmit the signals from the transducer to the service stations. While monitoring the pressures has been found to be highly beneficial for maintaining the cables in good operating condition, conductor pairs are being lost to the transmission of telecommunication messages.

It is consequently desirable to free the dedicated conductor pairs of their function to transmit pressure information, and to thereby increase the capacity of the cables to transmit telecommunication messages.

SUMMARY OF THE INVENTION

In accordance with the present invention a conduit includes a central duct for carrying a fluid under pressure. A plurality of electrical conductors are applied in a peripheral skew about the duct, and a conductive, flexible tubular casing encloses the duct and the conductors.

BRIEF DESCRIPTION OF THE DRAWING

The following detailed description of the invention will be more easily understood when reference is made to the accompanying drawing, wherein.

DETAILED DESCRIPTION

Figure 1:
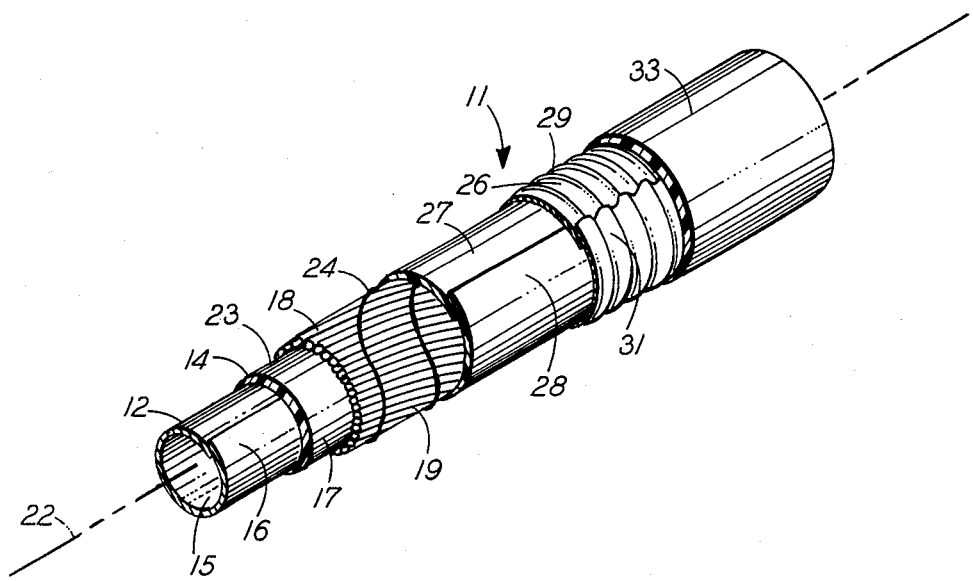
FIG. 1 is a pictorial cutaway illustration which shows a short length of a conduit including a gas feeder pipe duct surrounded by a pluralities of electrical conductors in accordance with the present invention.

In FIG. 1, a cutaway view depicts the physical structure of a gas feeder pipe assembly or conduit, designated generally by the numeral 11, which is described hereunder as a preferred embodiment in accordance with the present invention. In the conduit 11, a central cylindrical aluminum sheath 12 forms or gives shape to a duct 14. The sheath 12 is coated on both sides with an adhesive film 15, such as a polyethylene laminate. The film 15 bonds an overlap 16 of the sheath after it is rolled into its cylindrical shape, and bonds an extruded polyethylene jacket 17 to the duct 14 formed of the sheath 12. The aluminum sheath 12 in combination with the jacket 17 results in a pressurable pipe for carrying fluids, such as dry air, in a manner consistent with prior art practices.

About the duct 14, a plurality of insulated conductors 18 are applied in a peripheral layer 19. The conductors 18 are preferably pairwise color-coded in accordance with known cable forming practices. The conductors 18 are further applied about the periphery of the duct 14 in an oscillating lay, the lay establishes an alternately clockwise and counterclockwise oriented skew in the conductors 18 with respect to a central axis 22 of the duct 14. The lay gives additional length to the conductors 18 with respect to the length of the duct 14 to avoid stresses in the conductors 18 due to variations in expansions or contractions between the duct 14 and the conductors 18. Such variations can occur because of differences in thermal expansion coefficients between the duct 14 and the conductors 18. More significant, however, are variations in length between the conductors 18 and the duct 14, and even variations among the conductors themselves, that are caused by flexing the conduit 11 during its installation along meandering cable routes.

The desirable skew need not be established, however, by the oscillating lay. A continuous spiral of the lay serves a similar function to provide each of the conductors 18 with a sufficient additional length to avoid stresses on the conductors when the conduit 11 is being flexed.

In the preferred embodiment described herein, the conductors 18 are not embedded into, or otherwise made part of, the polyethylene jacket 17 of the duct 14. Instead, the jacket 17 serves as a smooth supporting surface 23 for the peripheral lay of the conductors 18. The conductors 18 are slideably held in place on the surface 23 by a binder 24. Preferably, the binder 24 is a two-end nylon binder, which is applied about the conductors 18 at a typical rate of 6 wraps per linear foot of the conduit 11.

While the polyethylene jacket 17 provides the smooth and electrically insulating supporting surface 23 on one side of the conductors 18, contact between the conductors 18 and an outer corrugated, continuously conductive aluminum casing 26 could result in electrically shorting one or more of the conductors 18, particularly if the insulation on the conductors 18 should become damaged through a rubbing contact with edges of the casing 26. Consequently, an insulating corewrap film 27 is applied over the lay of the conductors 18. The film 27 has a longitudinal overlapping portion 28. Preferably the film is a polyester film, such as, for instance, a polyethylene terephthalate film. Its thickness is typically 0.003 inch, and a three-eights overlapping portion 28 assures sufficient protection against baring any of the conductors 18 against the metal of the casing 26 so that the film 27 does not require a sealed seam.

The casing 26 is preferably corrugated in accordance with known cable manufacturing practices. The casing 26, again, has a two sided adhesive polymer coating 29. The coating 29 seals the casing to itself along an overlapped portion 31 which is typically ½ inch wide. In addition, the coating 29 forms a bond between an outer surface of the casing and a seamless outer jacket 33 of plastic extruded material, such as for example polyethylene.

Figure 2:
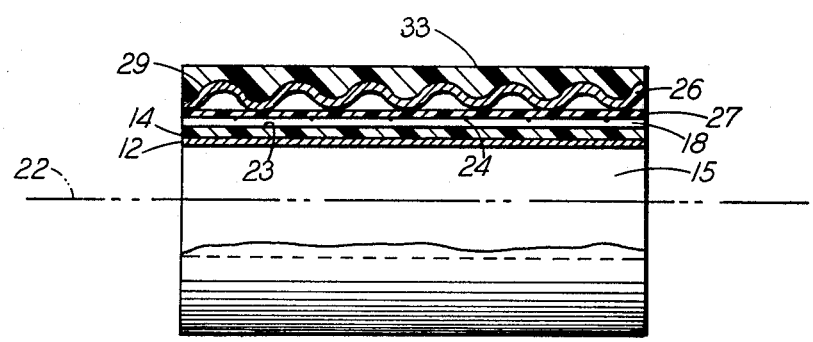
FIG. 2 shows a longitudinal section through the conduit illustrated in FIG. 1.

Referring now to FIG. 2, a longitudinal section of the conduit 11 illustrates some of the advantages of the conduit. The central duct 14 has substantially the same flexibility and strength of prior art gas feeder pipe. Inasmuch as the duct 14 represents the innermost component of the conduit 11, the duct 14 is sufficiently flexible to be installed along routes substantially the same as those of the prior art gas feeder pipes. Because of the unbound attachment of the conductors 18 to the duct 14, the conductors 18 are capable of shifting longitudinally with respect to the surface 23 of the duct 14.

Such shifting or relative movement between the conductors 18 and the duct 14 is possible because of the additional length each shifting conductor 18 has because of the skew in the lay of the conductors. The described oscillating lay most advantageously provides such additional lengths of the conductors 18 for small shifts between the conductors 18 and the duct 14 to occur when the conduit 11 is routed around bends and corners during its installation. The shifts minimize or entirely eliminate any stresses which might tend to rupture the duct 14 or break any of the conductors 18.

Any similar shift between the conductors 18 and the casing 26 is smoothed by the interposed corewrap film 27. The preferred film 27 is abrasion resistant to such relative shifts or movements with respect to the conductors 18 or the adjacent coated aluminum surface 34 of the casing 26. Consequently, each of the components of the conduit 11, the duct 14, the conductors 18, the film 27 and the casing 26 are permitted to shift longitudinally independently of each other. Because of the provision for free movement between these components no stresses are addably transferred from one such component to another as a result of flexing the conduit 11.

Because of the relatively large diameter of the aluminum casing 26 with respect to the aluminum sheath 12, the casing 26 tends to be subjected to greater bending strains when the conduit 11 is flexed as it would normally occur during its installation. The corrugated structure of the casing 26 provides for low stresses in the longitudinal direction as a result of such flexing of the conduit 11. In addition, the corrugated structure offers a relatively high resistance to radial collapse. The outer jacket 33, securely bonded to the casing 26 reinforces the casing and provides additional protection to both the conductors 18 and the duct 14 on the inside thereof.

A reference to the typical conduit 11 more clearly depicts relative sizes of the various described components in the conduit. In the preferred embodiment, the outer diameter of the duct 14 inclusive of the jacket 17 approximates three-quarters of an inch. The inner diameter of the casing 26 is approximately one inch. The innerdiameter of the casing 26 may vary however, depending on the size and the number of the conductors 18 within the conduit 11. Typically 25 pairs of the conductors 18 are placed about the duct 14. Using the casing 26 as a common ground return lead, signals from fifty transducers can be monitored at a central service office. Spacing the transducers at intervals between 2000 and 5000 feet the total length of the conduit 11 corresponds to 50 tranducers would correspond to an upper limit in the length of conduit in accordance with typical gas feeding practices. It should be realized, however, that the number of the conductors 18 to be included within the conduit 11 can be reduced. Twenty-five pairs of the conductors, however, have been found to be an optimum. Also, a typical conductor size of 24 gauge is conveniently deposited in a single layer about the duct 14.

The above description of a preferred embodiment of the invention is to serve as illustration and not as limitation of the invention. Changes and modifications in the structure can be made without departing from the spirit and scope of the invention, which is intended to be defined only by the appended claims.

What is claimed is:

1. A conduit which comprises:
   a central duct formed of a cylindrically rolled sheath bonded with an overlap to itself, and a plastic extrusion duct jacket bonded around the sheath in a pressurable combination for carrying a fluid under pressure, the duct jacket having a smooth outer surface;
   a plurality of electrical, insulated conductors located in a peripheral skew about the duct, the conductors being slidably supported against the outer surface of the duct jacket; and
   a continuously electrically conductive, flexible metal tube enclosing the duct and the conductors.

2. A conduit according to claim 1, wherein the peripheral skew in which the conductors are located about the duct is an undulating lay about the duct.

3. A conduit according to claim 2, which further comprises:
   an insulating film interposed between the conductors and the flexible tube.

4. A conduit according to claim 3, wherein the flexible tube comprises a circumferentially corrugated metal sleeve and a polyethylene outer jacket securely bonded to the outside of the sleeve.

* * * * *

UNITED STATES PATENT OFFICE
CERTIFICATE OF CORRECTION

PATENT NO. : 4,112,247
DATED : September 5, 1978
INVENTOR(S) : Dembiak et al.

It is certified that error appears in the above-identified patent and that said Letters Patent are hereby corrected as shown below:

Col. 2, line 15, delete --duct 14 formed of the--.

Col. 2, line 16, after "The" insert --duct 14 formed of the--.

Col. 3, line 47, "large" should be --larger--.

Col. 4, line 9, "innerdiameter" should be --inner diameter--.

Signed and Sealed this

Tenth Day of April 1979

[SEAL]

Attest:

RUTH C. MASON
Attesting Officer

DONALD W. BANNER
Commissioner of Patents and Trademarks